Jan. 1, 1957 — M. R. SOMMERIA — 2,776,399
WELDING SYSTEM
Filed June 12, 1952 — 2 Sheets-Sheet 1

INVENTOR.
Marcel R. Sommeria
BY
Foorman L Mueller Atty.

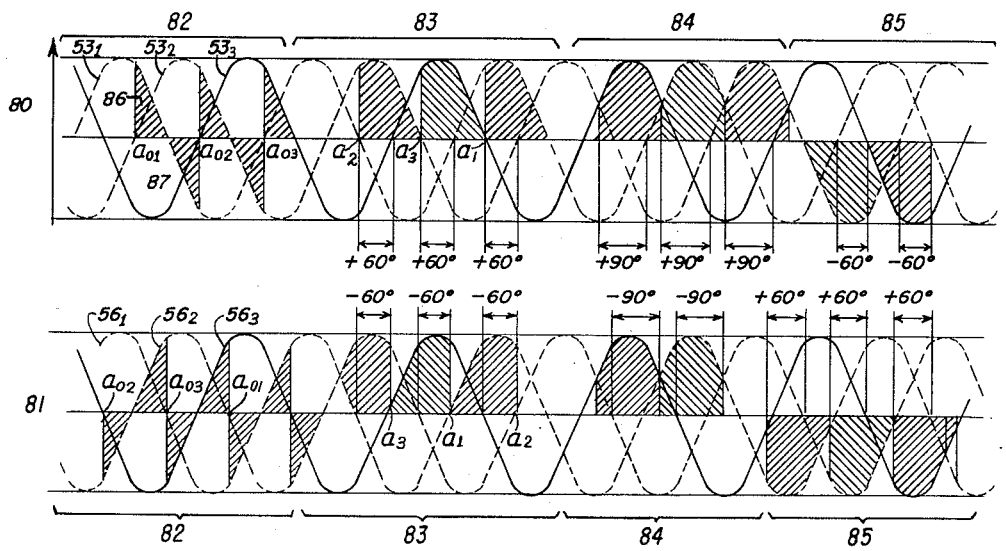
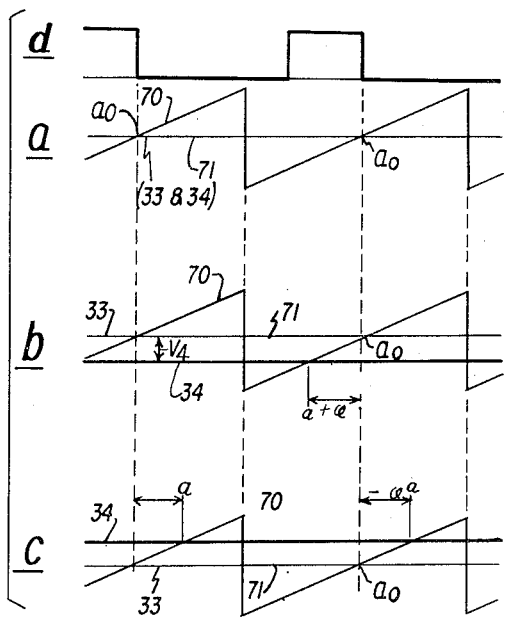
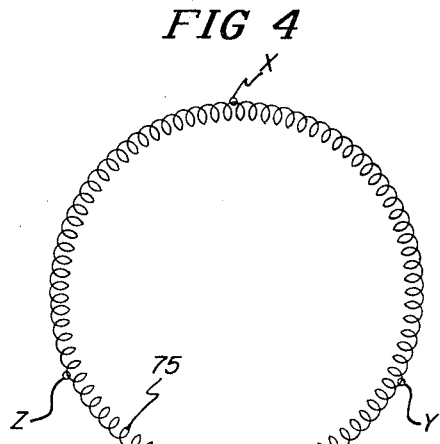

United States Patent Office 2,776,399
Patented Jan. 1, 1957

2,776,399

WELDING SYSTEM

Marcel R. Sommeria, Chicago, Ill., assignor to Welding Research, Inc., Chicago, Ill., a corporation of Illinois Application June 12, 1952, Serial No. 293,121

14 Claims. (Cl. 323—18)

This invention relates generally to resistance welding machines and more particularly to a control circuit for such machine causing the welding current to be rapidly controlled to correspond to a predetermined wave form.

There exist resistance welding machines in which the primary of the working transformer is fed from a polyphase source, each phase being provided with ionic-tube rectifiers (ignitrons) whose ignition electrodes are controlled by electronic circuits performing such operations as the reversal of the direction of the current, changes in its intensity, or variations in the duration of individual current pulses sent into the transformer's primary. However, the existing machines do not furnish currents that instantly adjust themselves to the changing requirements of the welding of a given workpiece, nor do they generally permit any arcuate adjustment of that kind.

As is known, machines of this type are sluggish as to current reversals, due to energy accumulations which tend to prevent the current from reaching zero intensity and then changing its direction. Owing to the machine's self induction, the low frequency changes in the direction of the current are accomplished by alternating changes. The electronic control circuits cause alternate operation of the ionic rectifiers either to derive energy from the external alternating current source in the usual rectifier function, or to operate as inverter with energy being returned thereby to the alternating current source. It has been necessary to introduce a stop period in the work of the above machines between the two current pulses of opposite direction, to prevent the occurrence of short circuits which would render all operation impossible. Since, in practice, some of the desired welding current wave forms will require very rapid reversals of the direction of the current, a special device is desired which makes such reversals possible.

It is therefore, an object of the present invention to provide a welding system wherein welding current pulses are provided which closely and rapidly follow an established pilot voltage wave having the same wave form as the desired welding current.

A further object of this invention is to provide a control circuit for a resistance welding machine which provides very rapid reversals of the direction of current flow through the welding piece.

A further object of the invention is to provide precise control of resistance welding machines which are energized by a three-cycle three-phase source of, for example, 50 cycles per second and provides a welding current of very low frequency, such as 5 cycles per second for the welding load circuit.

A feature of the present invention is the provision of a welding machine including a welding transformer connected to an alternating current source through a rectifier system including elements connected in opposite polarity, with a control system for controlling the conductivity of the rectifiers which compares the actual welding current with a pilot voltage and corrects the wave form of the welding current so that it corresponds to the wave form of the pilot voltage.

A further feature of this invention is the provision of a welding machine including a frequency changing device such as a cyclo-converter which controls the conductivity of the energizing rectifiers to provide more current by selectively rendering one of the rectifiers conducting or to provide less current by selectively rendering another rectifier conducting to serve as an inverter which feeds current into the power supply.

A further feature of this invention is the provision of a servo-mechanism coupled to the welding load circuit to provide a voltage corresponding to the welding current and a system for combining this voltage with a pilot voltage of the desired wave form to produce an error voltage. The error voltage is then used to control the conductivity of rectifying elements to correct the load current so that it corresponds in wave form to the pilot voltage.

A still further feature of the invention is the provision of a three-phase welding system including a pair of rectifiers connected in opposite polarity for each of the three phases, with a thyratron control circuit for each rectifying element and with all the control circuits connected in a system which controls the same in accordance with the error of the wave form of the welding current with respect to the wave form of a pilot voltage.

Further objects, features and the attending advantages of the invention will be apparent from a consideration of the following drawings in which:

Fig. 2 is a plurality of curves showing the welding current in the various rectifiers in the system of Fig. 1;

Fig. 3 is a group of curves illustrating the control potentials applied to the grids of the rectifier tubes; and Fig. 4 illustrates one form of phase deriving system for use in the system of Fig. 1.

Figure 1:
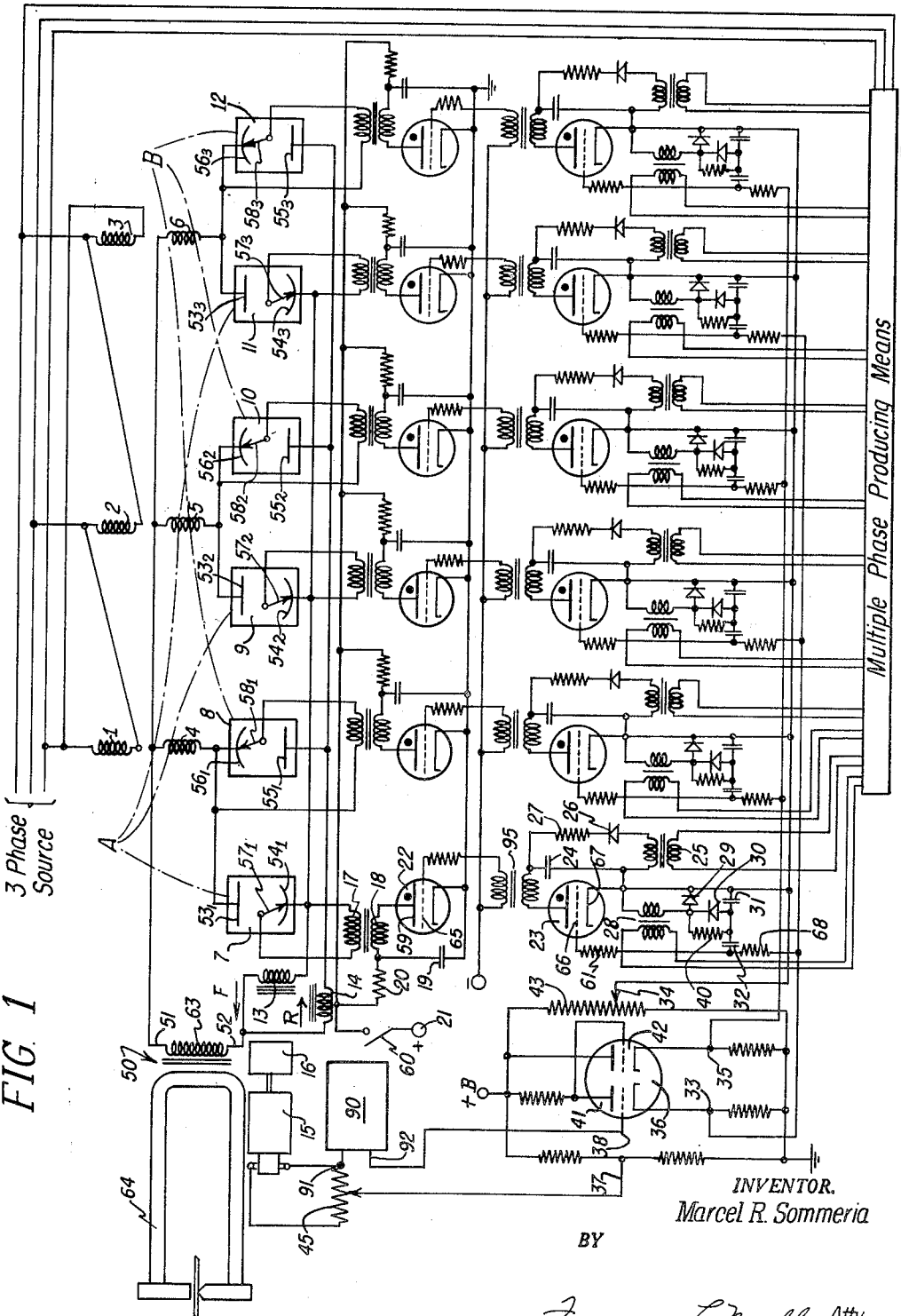
Fig. 1 is a circuit diagram illustrating the welding machine.

In practicing the invention a welding system is provided which includes a three phase circuit feeding the primary of the welding transformer and including two groups of ionic tubes, such as ignitrons. Each tube of the first group is mounted in a position that is reversed with respect to that of the corresponding tube of the second group, and with each set of corresponding tubes being connected with one of the phases of the 3-phase line. Each group of tubes feeds the primary of the welding transformer through an inductance. The ignition electrodes of the ionic tubes are controlled by pulses coming from a sawtooth potential oscillation, one for each group of tubes, whose mean level is automatically regulated according to the momentary value of the current intensity necessary for the welding operation. The position of the above mean level is so correlated with the phase of ignition of the ionic tubes that it is possible to provide zero current or any desired finite current. This is accomplished by an adjustment of the current in both groups of ionic tubes, with the feeding current being in either direction depending on whether the first of the above tube groups is functioning as a rectifier, the second one working as an inverter, or vice versa. As the tubes of each group are coupled to the welding transformer through an inductance, both groups can be rendered conducting at the same time to provide rapid reversal of current without causing a short circuit which would result if the inductance was not present. The system also included a device measuring the momentary intensity of the welding current by the magnetic field of the load current interacting with the rotor of a D. C. generator, and inducing at the rotor's terminals a voltage that is constantly proportional to the momentary intensity of the welding current. This voltage is combined with a pilot voltage and the resulting error voltage controls the mean level of the sawtooth potential oscillations referred to above.

Referring now to the drawings, in Fig. 1 there is illustrated a welding machine fed by a 3-phase line, each phase feeding a primary coil 1, 2 and 3 of the main transformer, the three coils being connected in delta. The secondary coils 4, 5, and 6, corresponding to primaries 1, 2 and 3, are connected in star, and each secondary coil 4, 5, and 6 is connected to the primary 63 of the welding transformer 50. More specifically, the common point of the secondaries 4, 5, and 6 is connected to the terminal 51 of the primary winding 63.

The opposite ends of the secondaries 4, 5 and 6 are connected, through ionic tubes, such as ignitrons 7, 8 and 9 and through an inductance 13, to the other terminal 52 of the primary winding 63 of the welding transformer 50. The ignitrons 7, 9 and 11 are connected in such a way as to provide a current flow in the direction indicated by the arrow F. For this purpose the terminals of the secondary coils 4, 5 and 6 are connected to the plates $53_1$, $53_2$, and $53_3$ of the ignitrons 7, 9 and 11, respectively, while the inductance 13 is connected to the common point of the cathodes $54_1$, $54_2$ and $54_3$ of the same ignitrons.

Also, the terminals of the secondary coils 4, 5 and 6 are connected through ionic tubes, such as ignitrons 8, 10 and 12 and through the inductance 14, to the terminal 52 of the primary 63 of the welding transformer 50. The ignitrons 8, 10 and 12 are connected in such a way as to correspond to a current direction indicated by the arrow R, opposite to that of F. For this purpose the coils 4, 5 and 6 are connected to the cathodes $56_1$, $56_2$, and $56_3$ of ignitrons 8, 10 and 12, while one of the terminals of the inductance 14 is connected to the plates $55_1$, $55_2$ and $55_3$ of ignitrons 8, 10 and 12.

The three ignitrons 7, 9 and 11 form a group A acting as a rectifier whenever anodes 53, connected to secondary windings 4, 5 and 6 of the feed transformer, are positive. Similarly, ignitrons 8, 10 and 12 form a group B acting as a rectifier whenever cathodes 56, connected to secondary windings 4, 5 and 6 of the feed transformer, are negative. The two ignitron groups A and B supply the current to the primary 63 of the welding transformer 50 of the welding machine, the secondary 64 of which is connected to the work electrodes. The ignitron feeding circuit described is accompanied both by individual ignition controlling circuits for the ignitrons 7, 8, 9, 10, 11 and 12, and by a system for controlling the individual ignition circuits.

The ignition controlling circuit for the ignitrons 7, 8, 9, 10, 11 and 12 controls the ignition electrodes $57_1$, $57_2$, and $57_3$ or ignitrons 7, 9, 11 forming group A, as well as ignition electrodes $58_1$, $58_2$, and $58_3$ of ignitrons 8, 10 and 12 forming group B. The circuit for ignitron 7 is connected to the ignition electrode $57_1$ thereof through the secondary coil 17 of a transformer having a primary 18. In the same manner, all other ignition electrodes are coupled through a transformer comprising a secondary 17 and a primary 18. Since all of these circuits are identical, it will suffice to describe the ignition controlling circuit of only one of the ignitrons, that is, of ignitron 7.

Each circuit includes a thyratron 22 having a plate 59 connected to the positive terminal of the D. C. source 21, over the general switch 60, the resistance 20, and the primary 18 of the transformer. A condenser 19 is charged through the resistance 20, by the D. C. source 21. As will be explained later, the grid 65 of the thyratron 22 receives positive pulses of very short duration, thus allowing current to pass through the thyratron 22, discharging the condenser 19 through the primary 18 of the transformer controlling the ignitron 7. A pulse is thus obtained in the secondary 17 which is transmitted to the ignition electrode 57 of the ignitron 7, allowing the latter to function as a conductor. The primary 18 and the condenser 19 together form an oscillating circuit which supplies a damped sinusoidal voltage to the terminals of the primary 18 whenever the grid 65 of the thyratron 22 receives a positive pulse. In this way the plate 59 of the thyratron becomes negatively charged for an interval of time sufficient for the de-ionizing of the thyratron.

The positive pulse impressed on the grid 65 of thyratron 22 is produced in the ignition control circuit. Since these circuits are identical for all ignitrons 7 to 12 and all thyratrons 22, the description of one of them will be sufficient, and only the circuit related to thyratron 22 will be described. Each ignition control circuit includes a thyratron 23 having connected to the plate thereof a circuit including peaking transformer 25 having a saturated secondary circuit which includes rectifier 26, resistance 27 and condenser 24. The condenser 24 is charged from the pulses produced by the transformer 25 and is discharged thereafter into thyratron 23 through the primary of the transformer 95. The primary of the peaking transformer 25 is connected to two properly chosen terminals of the phase producing means 75 which is fed from the three-phase line. The phase of the voltage applied to the peaking transformer is selected to provide a charge across the condenser at a predetermined time with respect to the phase of the voltage applied to the ignitron 7.

The grid 66 of the thyratron 23 is connected in a circuit whose essential element is a peaking transformer 28 with a saturated secondary circuit and a primary that is connected to two other properly chosen terminals of the phase producing means 75. These terminals are chosen so as to produce a negative voltage peak in the secondary coil of transformer 28 before the condenser 24 is charged positively. The circuit also includes two rectifiers 29 and 30, and two condensers 31 and 32. One end of the secondary coil of the transformer 28 is connected to cathode 67 of thyratron 23, while its other end is connected, over the rectifier 30, to the common point between condensers 31 and 32. Accordingly, a circuit for charging the condenser 31 is formed through the secondary of the transformer 28 and the rectifier 30, the current flowing in the direction permitted by the rectifier 30. The discharging circuit consists of the same peaking transformer secondary 28 and rectifier 30 shunted by the resistance 40, the current flowing in the direction opposite to that permitted by the rectifier. By this device the charging periods are made very short, while the discharge periods, owing to the reverse resistance of the rectifier shunted by the resistance 40, are relatively long. The peak voltage supplied by the transformer 28 is thus transformed into a sawtooth voltage on the terminals of the condenser 31. The only purpose of the rectifier 29 is to short-circuit negative pulses appearing at the terminals of the transformer secondary 28. The sawtooth voltage so obtained (see Figure 3) is supplied to the grid of thyratron 23 through the condenser 32 and the resistance 61.

The common point between the condenser 32 and the resistance 61 is connected by resistance 68, to the terminal 33 of a symmetrical amplifier 36. The amplifier 36 includes two triode sections 41 and 42 with the input voltage being applied from terminal 38 to the grid of the triode section 41 and the first output terminal 33 being provided at the cathode of the triode section 41. The plate of the triode section 41 is coupled to the grid of the triode section 42 and the second output terminal 35 is provided at the cathode of the triode section 42. The input signals therefore applied between terminals 37 and 38 will appear as symmetrical voltages at points 33 and 35, these voltages being balanced with respect to terminal 34. This balance may be accurately established by the adjustment of the movable tap on resistance 43 to which the terminal 34 is connected. The amplifier 36 supplies a variable polarization voltage $V_4$ to the thyratrons 23. This polarization voltage $V_4$ is superimposed on the sawtooth voltage appearing on the terminals of the condenser 31. Thus, the symmetrical amplifier 36 establishes a voltage V4 between the conductors 34 and 33, and another voltage V4 which is equal and opposite between the conductors 34 and 35. The conductor 34 forming the middle point, is connected to the terminal of the condenser 31 which is in turn connected to the cathode of the thyratron 23.

Reference is made to Fig. 3 for a consideration of the operation of the control circuit. Curve $a$ represents the grid voltage of thyratron 23 as a function of the time, for the case when the voltage V4 is zero. This sawtooth voltage 70 which is transmitted to the grid 66 of the thyratron 23 by the condenser 32, has an axis of symmetry 71 where the potential is that of the conductor 33. Whenever the voltage V4 is zero as is the case represented on curve $a$, the symmetry-axis potential is zero, because the potential of the cathode is that of the conductor 34. Under such conditions, the ignition in the thyratron takes place at a moment corresponding to point $a_0$, that is, when the potential on the sawtooth curve becomes positive.

If the voltage V4 has a certain positive value as in curve $b$, it serves to lift up the axis 71 of the sawtooth voltage, and the ignition in the thyratron takes place at point $a$ instead of $a_0$. The new point corresponds to the phase where the resultant of the superposition of V4 on the sawtooth voltage becomes positive. The displacement $+\phi$ on curve $b$ represents the phase difference with respect to $a_0$. On the other hand, if the voltage V4 is negative as shown in curve $c$, the ignition takes place at point $a$ which shows a phase difference $-\phi$ with respect to $a_0$. It is thus possible to regulate the ignition of thyratron 23 by simply varying the voltage V4 between conductors 33 and 34, and the opposite voltage between conductors 34 and 35.

Curve $d$ of Fig. 3 shows the voltage across condenser 24 with respect to the sawtooth voltage at the grid of thyratron 23. As previously stated, this condenser is charged positively after condenser 31 is charged negatively. The condenser 24 is then discharged when the sawtooth wave reaches the zero point. Curve $d$ as shown corresponds to curve $a$. The charging of condenser 24 must be at least 90° ahead of the $a_0$ point to permit an advance in phase (curve $b$) of at least 90°.

The three ignitrons 7, 9 and 11 forming the group A are controlled by the voltage plus V4 between conductors 33 and 34, while the three ignitrons 8, 10 and 12 forming group B are controlled by the voltage minus V4 between conductors 34 and 35. By this device both groups of ignitrons A and B are constantly controlled. This is represented on the diagrams of Fig. 2, the upper diagram 80 showing the operation of group A and the lower diagram 81 showing that of group B. Diagram 80 (group A) gives the voltage curve of the anodes $53_1$, $53_2$ and $53_3$ of ignitrons 7, 9 and 11 with respect to terminal 51, and the shaded areas represent the time when the ignitrons are conductive so that the cathodes also have the voltages shown by the curves. Diagram 81 (group B) gives the voltage curve of the cathodes $56_1$, $56_2$ and $56_3$ of ignitrons 8, 10 and 12 with respect to terminal 51, and the shaded areas represent the time when the ignitrons are conductive so that the anodes also have the voltages shown by the curves. Since an anode of group A and a cathode of group B are fed simultaneously by the same secondary winding, it is possible to utilize similar voltage curves in the joint diagram.

Diagrams 80 and 81 are each subdivided into four parts 82, 83, 84 and 85 spaced along the time axes or abscissas. Part 82 coresponds to operation at zero power (V4=0), that is, during the period when the phase shift with respect to the origin is zero. This is the case illustrated by curve $a$ of Fig. 3. Parts 83 and 84 correspond to the periods when group A operates as a rectifier, that is, when the ignition phase shift of the ignitrons with respect to the origin is positive. This is shown by the deplacement of point $a$ of curve $b$. Part 83 represents a phase displacement of 60°, and part 84 represents a phase displacement of 90°, which is the period of maximal power. Part 85 corresponds to the period during which group A operates as an inverter, with a phase shift with respect to the origin equal to minus 60°, as shown in curve $c$.

Counterparts of the above four parts relative to group A are the same four parts 82, 83, 84 and 85 relative to group B and represented on diagram 81. Part 82 corresponds to a phase shift with respect to the origin equal to zero. Part 83 corresponds to a phase shift in group B equal to minus 60° (that is, opposite to that in group A), the group B operating as an inverter. Part 84 corresponds to a phase shift in group B of minus 90°, which is the condition for maximum power. Finally, part 85 corresponds to the operating of group B as a rectifier, with a phase shift with respect to the origin equal to plus 60°.

Symbols indicating in diagrams 80 and 81 the times of ignition of the ignitrons of both groups are the same that are used in Fig. 3. However, subscripts corresponding to various phases are added to symbols $a$ and $a_0$ on diagrams 80 and 81. Thus, $a_{01}$ denotes the ignition angle of phase 1 of zero power output, whereas $a_2$ is the ignition angle of phase 2 defined by the phase shift applied thereto.

The phasing of the sawtooth wave developed from the voltage fed through the transformer 28 of the circuit of thyratron 33 must be related to the phase of the current through the coil 4 of the three-phase transformer so that the crossover point $a_0$ for zero power follows by 120° the current reversal from negative to positive. This is shown in Fig. 2 wherein the point $a_{01}$ lags about 120° the current through plate $53_1$ as it passes from negative to positive. The control circuits associated with the ingnitrons 9 and 11 must similarly be related in phase to the currents in the coils 5 and 6 of the three-phase transformer. Similarly, the voltage fed to the control circuits associated with the ignitrons 8, 10 and 12 must be related to the current therethrough so that the crossover point of the sawtooth wave for zero power lags the curve reversal from positive to negative by about 120°. The voltage wave applied to the transformer 25 which produces the pulse across condenser 24 connected to the plate of the thyratrons 23 must also be related to the phase of the current in the controlled ignitron. This phase must be adjusted so that the voltage developed across condenser 24 leads the crossover point of the sawtooth wave at zero power by about 90°. This will permit the thyratron 23 to fire 90° ahead of the zero point in the event that the control voltage V4 is positive to raise the level of the sawtooth wave. A 90° positive phase displacement provides maximum power. It is to be pointed out that the entire control of the circuit takes place by the operation of the thyratrons 23, and the thyratrons 22 merely serves as amplifiers to provide the current necessary for rendering the ignitrons conducting.

The voltages of the desired phases as required for operating the thyratorns 23 can be provided by phase-developing systems of various constructions as for exemple, by the winding of an induction motor. This is illustrated in Fig. 4 wherein the winding is shown in circular form with the three-phase energy being applied at terminals X, Y and Z. It is therefore apparent that voltages of any desired phase may be taken from such a winding and that the voltages of different phases applied to the transformers 25 and 28 of each of the six controlling thyratons 23 may be so derived. This requires a total of twelve different voltages in all. However, it may be possible to use voltages of the same phase in more than one of the six controlling circuits but in any event, voltages of any desired phase are available in the winding illustrated in Fig. 4.

As a general rule, the mean value of the electromotive force is given by the difference between positive and negative shaded areas, such as those shown in part 82 of diagram 80. It is seen that the position of point $a$ in part 82 of diagram 80, which would correspond to a zero mean value of the electromotive force, is determined by the condition that the shaded positive area 86 should equal the shaded negative area 87. As shown in part 82 of diagram 81, the ignition phase of ignitrons belonging to the group B has been chosen so as to be similar to that of the group A, the mean electromotive force supplied by group B being also zero.

Considering now part 83 of diagram 80, this illustrates the ignition of group A, with the points $a_1$, $a_2$ and $a_3$ being produced by a phase shift of plus 60°. The correlated points $a_1$, $a_2$ and $a_3$ in part 83 of diagram 81, shows the ignition of group B, with a phase shift of minus 60°. It follows that, while group A is operating as a rectifier (its E. M. F. is no longer zero), group B operates as an inverter susceptible of changing a D. C. into an A. C. and, therefore, presenting a certain counter E. M. F. which is proportional to shaded areas of part 83 of diagram 81. Assuming that stationary performance is reached in the transformer 50 of the welding machine, no interchange should take place between the D. C. and A. C. circuits, and therefore, the E. M. F. furnished by group A functioning as a rectifier must be equal to the counter E. M. F. supplied by group B operating as an inverter. In the case of part 83 of our diagrams, the above condition is found to be satisfied if the circuit of the group A of ignitrons is adjusted to a plus 60° phase shift, and that of the group B to a minus 60° phase shift.

As illustrated in parts 84 of diagrams 80 and 81, maximum power is obtained at angles equal to plus 90° and minus 90°, respectively. It is seen that the reversal of phase shifts in the groups A and B produces a reversal of the current direction in the transformer 50.

It follows that, by using the inverter properties of the circuit, it is possible to realize very rapid current reversals and non-delayed transfers to the A. C. circuit of the total amount of energy accumulated in the D. C. circuit. The inductances in series with the ignitrons permit both rectifier and inverter action at the same time without producing a short circuit. It becomes possible to obtain non-delayed reversals of the direction of current in the welding transformer 50, and to realize any current patterns in the secondary coil 64 of the transformer 50.

The arrangement by which the current control is performed will now be described. A device 90 is provided which produces a voltage $V_2$ at its terminals 91 and 92, which is the desired voltage for the welding transformer 50. This will be called the "pilot voltage." The voltage wave $V_2$ may be generally of a square wave form, with the amplitude and rate of rise and decay of the wave depending on the welding action required. This may be provided by a generator which develops the wave directly, or by other means such as recording and reproducing devices.

A second voltage $V_1$ is then superimposed on $V_2$, namely, the voltage supplied by the generator 15, which is proportional to the current in the secondary winding 64 of the welding transformer 50. This generator, which may be a standard direct current generator with the usual field producing means removed, is rotated at a constant speed by the synchronous motor 16. The magnetic field through the secondary 64 therefore produces a voltage at the terminals of the generator 15. By the use of the above device, a variable voltage $V_1$ is obtained at the terminals of the generator, which is proportional to the current in the secondary 64 of the welding machine. A potentiometer 45 may be provided across the generator 15 for dividing down this voltage.

The algebraic sum of the voltages $V_1$ and $V_2$, designated $V_3$, is applied at the input terminals of the amplifier 36, the output terminals furnishing the voltages plus $V_4$ and minus $V_4$. A counteraction effect is obtained by means of the following arrangement of the circuit directions. Whenever the input terminal 38 of the amplifier 36 is positive, its output terminal 33 is also positive. If, at the beginning of the operation, the pilot voltage $V_2$ is such as to make the terminal 38 positive, this same voltage $V_2$ is that applied at the input terminals of the amplifier 36, because $V_1$ is still zero at this initial stage of the operation. Under these conditions the output terminals of the amplifier 36 furnish a positive potential at the terminal 33, and a negative potential at the terminal 35.

As a result, the ignitron group 7, 9 and 11 operates as a rectifier and the current direction in the primary of the welding transformer 63 is that of the arrow F. The secondary current in circuit 64 acts on the field of the generator 15 in such a way that the voltage $V_1$ supplied by the latter opposes the pilot voltage $V_2$, the resultant voltage $V_3$ being the difference between the absolute values of $V_1$ and $V_2$. Since the amplifying coefficient of the tube 36 is very large, its output voltage $V_4$ can have a finite value only if the above resultant voltage $V_3$ is very small, that is, if $V_1$ is almost equal to $V_2$. It follows that the "error," or the difference between a given value of $V_2$ and the obtained value of $V_1$, decreases with the increasing value of the amplifying coefficient of the amplifier 36. As explained previously, the resulting voltage $V_4$ controls the performance of the ignitron groups A and B in such a way that the current in the secondary 64 of the welding transformer 50 is constantly equal, within very narrow limits, to the momentary value of the desired current represented by the pilot voltage $V_2$.

It is therefore seen that a control system has been provided which causes the welding current to follow very rapidly and accurately a desired pilot wave form. This welding current is very efficiently provided from a three phase voltage source. The overall system is flexible permitting use thereof in many applications.

Although one embodiment of the invention has been illustrated it is obvious that various changes can be made therein without departing from the intended scope of the invention as defined in the appended claims.

I claim:

1. Apparatus for electric resistance welding of metals including in combination, a three-phase source of alternating current, a welding transformer including a primary winding and a secondary winding, a load circuit coupled to said secondary winding, rectifier means connecting said three-phase alternating current source to said primary winding including a pair of rectifier elements connected in opposite polarity to each phase of said source, said rectifier elements including control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce a control voltage representing the difference in said voltages, a plurality of control circuits individually associated with said rectifier elements and connected to the control portions thereof for selectively rendering said rectifier elements conducting, said control circuits including means connected to said three-phase source for energizing the same therefrom during predetermined portions of each cycle of the voltage wave applied to the associated rectifier element, and means applying said control voltage to said control circuits for controlling operation thereof to produce a current wave in said load circuit which substantially corresponds in wave form to said pilot voltage.

2. Apparatus for electric resistance welding of metals including in combination, a three-phase source of alternating current, a welding transformer including a primary winding and a secondary winding, a load circuit coupled to said secondary winding, rectifier means connecting said three-phase alternating current source to said primary winding including a pair of rectifier elements connected in opposite polarity to each phase of said source, said rectifier elements including control portions for rendering the same conducting, a plurality of control circuits individually associated with said rectifier elements and connected to the control portions thereof for selectively rendering said rectifier elements conducting, means connected to said three-phase source for energizing said control circuits therefrom during a predetermined portion of each cycle of the voltage wave applied to the associated rectifier elements, means for developing a sawtooth voltage wave for each control circuit from said three-phase source, means for producing a pilot voltage having the wave form desired of the current in said load circuit, means coupled to said load circuit for generating a voltage corresponding to the current flowing therein, means for combining said pilot voltage and said generated voltage to produce a control voltage representing the difference in said voltages, and means for combining said control voltage and said sawtooth wave and for applying said combined wave to said control circuits for controlling operation thereof to produce a current wave in said load circuit which substantially corresponds in wave form to said pilot voltage.

3. Apparatus for electric resistance welding of metals including in combination, a three-phase source of alternating current, a welding transformer including a primary winding and a secondary winding, a load circuit coupled to said secondary winding, a circuit means connecting said three-phase alternating current source to said primary winding including a pair of ignitrons connected in opposite polarity to each phase of said source, said ignitrons including control portions for rendering the same conducting, a plurality of control circuits individually associated with said ignitrons and including thyratron tubes having the output electrodes connected to said control portions for selectively rendering said ignitrons conducting, condenser means connected to said thyratron output electrodes, means for charging said condenser means from said three-phase source during a predetermined portion of each cycle of the voltage wave applied to the associated ignitron, means for developing a saw-tooth voltage wave for each thyratron tube from said three-phase source having a predetermined phase relation with respect to the voltage wave applied to the associated ignitron, means for producing a pilot voltage having the wave form desired of the current in said load circuit, means coupled to said load circuit for generating a voltage corresponding to the current flowing therein, means for combining said pilot voltage and said generated voltage to produce a control voltage representing the difference in said voltages, and means for individually combining said control voltage with each of said sawtooth waves and for applying each combined wave to the control electrode of the respective thyratron tubes for selectively providing a current pulse which renders the associated ignitron conductive to produce a current wave in said load circuit which substantially corresponds in wave form to said pilot voltage.

4. Apparatus for electric resistance welding of metals including in combination, a three-phase source of alternating current, a welding transformer including a primary winding and a secondary winding, a load circuit coupled to said secondary winding, first and second circuits connecting said three-phase alternating current source to said primary winding each circuit including a rectifier element connected to each phase of said source and inductance means connected in series therewith, said rectifier elements of said first and second circuits being connected in opposite polarities and including control portions for rendering the same conducting, a plurality of control circuits individually associated with said rectifier elements and connected to the control portions thereof for selectively rendering said rectifier elements conducting, means connected to said three-phase source for energizing said control circuits therefrom during a predetermined portion of each cycle of the voltage wave applied to the associated rectifier element, means for developing a sawtooth voltage wave for each of said control circuits from said three-phase source, means for producing a pilot voltage having the wave form desired of the current in said load circuit, means coupled to said load circuit for generating a voltage corresponding to the current flowing therein, means for combining said pilot voltage and said generated voltage to produce first and second balanced control voltages representing the difference in said voltages, means for combining said first control voltage individually with each of said sawtooth waves for said control circuits associated with said rectifier elements of said first circuit, means for combining said second control voltage individually with each of said sawtooth waves for said control circuits associated with said rectifier elements of said second circuit, and means for applying said combined control voltages to the respective control circuits for controlling operation thereof to produce a current wave in said load circuit which substantially corresponds in wave form to said pilot voltage.

5. Apparatus for electric resistance welding of metals including in combination, a three-phase source of alternating current, a welding transformer including a primary winding and a secondary winding, a load circuit coupled to said secondary winding, first and second circuits connecting said three-phase alternating current source to said primary winding each circuit including an ignitron connected to each phase of said source and inductance means connected in series therewith, said ignitrons of said first and second circuits being connected in opposite polarities and including control portions for rendering the same conducting, a plurality of control circuits individually associated with said ignitrons and including thyratron tubes having input electrodes and output electrodes connected to said control portions, condenser means connected to said output electrode of each thyratron tube, rectifier means connected to said three-phase source for charging said condenser means herefrom during a predetermined portion of each cycle of the voltage wave applied to the associated ignitron, means for developing a sawtooth voltage wave for each of said control circuits from said three-phase source, means for producing a pilot voltage having the wave form desired of the current in said load circuit, means coupled to said load circuit for generating a voltage corresponding to the current flowing therein, means for combining said pilot voltage and said generated voltage to produce first and second balanced control voltages representing the difference in said voltages, means for combining said first control voltage individually with each of said sawtooth waves for said control circuits associated with said ignitrons of said first circuit, means for combining said second control voltage individually with each of said sawtooth waves for said control circuits associated with said ignitrons of said second circuit, and means for applying said combined control voltages to said input electrodes of said thyratron tubes of the respective control circuits for controlling operation thereof to produce a current wave in said load circuit which substantially corresponds in wave form to said pilot voltage.

6. Apparatus for electric resistance welding of metals including in combination, a three-phase source of alternating current, a welding transformer including a primary winding and a secondary winding, a load circuit coupled to said secondary winding, first and second circuits connecting said source of alternating current to said primary winding, with each circuit including a rectifier element connected to each phase of said source and inductance means in series therewith, and the rectifier elements of said first and second circuits being connected in opposite polarities, said rectifier elements including control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce a control voltage representing the difference in said voltages, and means operated by said control voltage and connected to said control portions of said rectifier elements for selectively rendering said rectifier elements conducting to produce a current wave in said load circuit substantially corresponding in wave form to said pilot voltage.

7. Apparatus for electric resistance welding of metals including in combination, a three-phase source of alternating current, a welding transformer including a primary winding and a secondary winding, a load circuit coupled to said secondary winding, first and second circuits connecting said source of alternating current to said primary winding, with each circuit including a rectifier element connected to each phase of said source and inductance means in series therewith, and the rectifier elements of said first and second circuits being connected in opposite polarities, said rectifier elements including control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce first and second balanced control voltages representing the difference in said voltages, first control means operated by said first control voltage connected to said control portions of said rectifier elements of said first circuit, and second control means operated by said second control voltage connected to said control portions of said rectifier elements of said second circuit, said control means selectively rendering said rectifier elements conducting to produce a current wave in said load circuit substantially corresponding in wave form to said pilot voltage.

8. Apparatus for electric resistance welding of metals including in combination, a three-phase source of alternating current, a welding transformer including a primary winding and a secondary winding, a load circuit coupled to said secondary winding, cycloconverter frequency changing means connecting said three-phase alternating current source to said primary winding including a plurality of rectifier elements having control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce a control voltage representing the difference in said voltages, a plurality of control circuits individually associated with said rectifier elements and connected to the control portions thereof for selectively rendering said rectifier elements conducting, and means applying said control voltage to said control circuits for controlling the time of operation thereof to produce a current wave in said load circuit which substantially corresponds in wave form to said pilot voltage.

9. Apparatus for electric resistance welding of metals including in combination, a three-phase source of alternating current, a welding transformer including a primary winding and a secondary winding, a load circuit coupled to said secondary winding, cycloconverter frequency changing means connecting said three-phase alternating current source to said primary winding including a plurality of rectifier elements having control portions for rendering the same conducting, means for producing a pilot voltage having the wave form of the current in said load circuit, means coupled to said load circuit for generating a voltage corresponding to the current flowing therein, means for combining said pilot voltage and said generated voltage to produce a control voltage representing the difference in said voltages, a plurality of control circuits individually associated with said rectifier elements and connected to the control portions thereof for selectively rendering said rectifier elements conducting, said control circuit including means connected to said three-phase source for energizing the same therefrom during predetermined portions of each cycle of the voltage wave applied to the associated rectifier element, and means applying said control voltage to said control circuits for controlling the time of operation thereof to produce a current wave in said load circuit which substantially corresponds in wave form to said pilot voltage.

10. Apparatus for electric resistance welding of metals including in combination, a three-phase source of alternating current, a welding transformer including a primary winding and a secondary winding, a load circuit coupled to said secondary winding, cycloconverter frequency changing means connecting said three-phase alternating current source to said primary winding including first and second groups of rectifier elements having control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce first and second balanced control voltages representing the difference in said voltages, a plurality of control circuits individually associated with said rectifier elements and connected to the control portions thereof for selectively rendering said rectifier elements conducting, each of said control circuits including means connected to said three-phase source for energizing the same therefrom during predetermined portions of each cycle of the voltage wave applied to the associated rectifier element, and means applying said first control voltage to said control circuits associated with said first group of rectifier elements and said second control voltage to said control circuits coupled to said second group of rectifier elements, for controlling the time of operation of all said rectifier elements to produce a current wave in said load circuit which substantially corresponds in wave form to said pilot voltage.

11. Apparatus for electric resistance welding of metals including in combination, a three-phase source of alternating current, a welding transformer including a primary winding and a secondary winding, a load circuit coupled to said secondary winding, cycloconverter frequency changing means connecting said three-phase alternating current source to said primary winding including first and second groups of rectifier elements having control portions for rendering the same conducting, means for producing a pilot voltage having the wave form desired of the current in said load circuit, means coupled to said load circuit for generating a voltage corresponding to the current flowing therein, means for combining said pilot voltage and said generated voltage to produce first and second balanced control voltages representing the difference in said voltages, a plurality of control circuits individually associated with said rectifier elements and connected to the control portions thereof for selectively rendering said rectifier elements conducting, each of said control circuits including means connected to said three-phase source for energizing the same therefrom during predetermined portions of each cycle of the voltage wave applied to the associated rectifier element, means for producing a sawtooth voltage wave for each control circuit, and means applying said first control voltage to said control circuits associated with said first group of rectifier elements and said second control voltage to said control circuits coupled to said second group of rectifier elements, for shifting the means levels of said sawtooth waves thereof, said control circuits rendering said rectifier elements conducting when the instantaneous voltage of said shifted sawtooth waves exceed a predetermined value to produce a current wave in said load circuit which substantially corresponds in wave form to said pilot voltage.

12. Apparatus for electric resistance welding of metals including in combination, a source of alternating current, a welding transformer including primary winding means and secondary winding means, a load circuit coupled to said secondary winding means, rectifier means connecting said source of alternating current to said primary winding means including rectifier elements connected in opposite polarity, said rectifier elements including control portions for rendering the same conducting, means for producing a pilot voltage having the wave form desired of the current in said load circuit, generator means coupled to said load circuit for developing a voltage corresponding to the current flowing therein, said generator means including a winding positioned adjacent said load circuit and in the field produced by the current therethrough, and means for moving said winding through said field at a uniform rate for inducing a voltage therein which varies with the strength of the load current, means for combining said pilot voltage and said developed voltage to produce an error voltage in accordance with variations of said developed voltage from said pilot voltage, and means operated by said error voltage and connected to said control portions of said rectifier elements for selectively rendering said rectifier elements conducting in the manner to eliminate said control voltage.

13. Apparatus for electric resistance welding of metals adapted to operate from a three-phase source of alternating current, said apparatus including in combination, a welding transformer including primary winding means and a secondary winding, a load circuit coupled to said secondary winding, power circuit means connecting said primary winding means to the three-phase alternating current source, said power circuit means including first and second rectifier elements connected to each phase of the source and inductance means connected in series therewith, said first and second rectifier elements for each phase being connected in opposite polarities and including control portions for rendering the same conducting, control circuit means including a plurality of portions individually associated with said rectifier elements and connected to said control portions thereof for selectively rendering said rectifier elements conducting, said control circuit means including a portion connected to the three-phase source and controlled in accordance with the wave form of the current desired in said load circuit, said control circuit means applying pulses to said control portion of each rectifier element to render the same operative during a predetermined part of each cycle of the voltage wave applied to said rectifier element by said power circuit means, to thereby control the wave form of the current in said load circuit.

14. Apparatus for electric resistance welding of metals adapted to operate from a source of alternating current, said apparatus including in combination, a welding transformer including primary winding means and a secondary winding, a load circuit coupled to said secondary winding, power circuit means connecting said primary winding means to the alternating current source, said power circuit means including a plurality of branches each having first and second rectifier elements and inductance means connected in series therewith, said first and second rectifier elements of each branch being connected with opposite polarities and including control portions for rendering the same conducting, said inductance means permitting said rectifier elements of opposite polarity to conduct simultaneously to provide rectifier and inverter action without producing a short circuit so that the current in said load circuit may be rapidly reversed, control circuit means including a plurality of portions individually associated with said rectifier elements and connected to said control portions thereof for selectively rendering said rectifier elements conducting, said control circuit means including a portion connected to the alternating current source and controlled in accordance with the wave form of the current desired in said load circuit, said control circuit means applying pulses to said control portion of each rectifier element to render the same conducting during a predetermined part of each cycle of the voltage wave applied to said rectifier element by said power circuit means, to thereby control the wave form of the current in said load circuit.

References Cited in the file of this patent

UNITED STATES PATENTS

| | | |
|---|---|---|
| 2,255,652 | Dawson et al. | Sept. 9, 1941 |
| 2,264,175 | Dawson et al. | Nov. 25, 1941 |
| 2,429,186 | Johnson | Oct. 14, 1947 |
| 2,600,519 | Solomon | June 16, 1952 |